United States Patent [19]

Doi

[11] Patent Number: 5,331,795
[45] Date of Patent: Jul. 26, 1994

[54] MOWING CUTTER UNIT FOR MOWER

[75] Inventor: Hachiro Doi, Miyashiro, Japan

[73] Assignee: Ahresty Corporation, Tokyo, Japan

[21] Appl. No.: 977,831

[22] Filed: Nov. 17, 1992

[30] Foreign Application Priority Data

Dec. 27, 1991 [JP] Japan .................. 3-107882

[51] Int. Cl.$^5$ .............................................. A01D 34/82
[52] U.S. Cl. ........................................ 56/255; 56/295;
56/DIG. 17
[58] Field of Search ........ 56/255, 295, 17.5, DIG. 17,
56/DIG. 20; 30/276, 347, 355

[56] References Cited

U.S. PATENT DOCUMENTS

| 3,135,081 | 6/1964 | Booth | 56/255 |
|---|---|---|---|
| 4,055,890 | 11/1977 | Seibold | 30/240 |
| 4,310,999 | 1/1982 | Onoue | 56/295 |
| 4,520,619 | 6/1985 | Doi et al. | 56/320.1 |
| 4,706,446 | 11/1987 | Doi et al. | 56/295 |
| 4,890,448 | 1/1990 | Doi | 56/255 |
| 4,987,732 | 1/1991 | Terai et al. | 56/295 X |
| 4,999,985 | 3/1991 | Doi | 56/255 |
| 5,054,276 | 10/1991 | Terai et al. | 56/242 |

Primary Examiner—Terry Lee Melius
Attorney, Agent, or Firm—Watson, Cole, Grindle & Watson

[57] ABSTRACT

A mowing cutter unit for a mower including a rotary cutter and a stationary cutter coaxially overlapped to each other, the rotary cutter is formed in an approximately polygonal shape in plan view and is formed with recessed cutting portions each being curved in an approximately doglegged shape toward the rotational direction at each vortex portion thereof; and the stationary cutter is formed with projecting cutting portions slidably contacted with respective recessed cutting portions of the rotary cutter on the peripheral edge in such a manner that it is shaped in a loosely circular arc from the cutting base to the cutting leading edge and a crossing angle at which the projecting cutting portion is rubbed with a grass pushing-out portion of the recessed cutting portion is larger than a crossing angle at which it is rubbed with a grass taking-in portion of the recessed cutting portion.

1 Claim, 2 Drawing Sheets

MOWING CUTTER UNIT FOR MOWER

FIELD OF THE INVENTION AND RELATED ART STATEMENT

The present invention relates to a mowing cutter unit for a mower, wherein grass is mowed in a manner to be nipped with a rotary cutter and a stationary cutter coaxially overlapped to each other.

This type of mowing cutter unit for a mower involves a technique disclosed in Japanese Utility Model Laid-open No. sho 49-31853, which is similar to the present invention.

The conventional mowing cutter unit for a mower described above is so constructed that each cutting portion of the rotary cutter is formed in a semilunar shape, thereby forming a semilunar space with each cutting portion of the stationary cutter when being crossed thereto. Accordingly, by use of this mowing cutter unit, grass can be taken in a manner to be scraped with the semilunar cutting portions of the rotary cutter, resulting in the enlarged take-in effect of grass. However, the above mowing cutter unit has the following disadvantage: Namely, the grass once taken between both the cutting portions of the rotary and the stationary cutters is enclosed in the semilunar space and is thus obstructed from escaping, so that the load applied on the rotary cutter is varied depending on the amount of the taken grass, and in an extreme case, the rotation of the rotary cutter is often locked with the taken grass. Consequently, the excessive load due to the load variation is applied on a power source (drive motor or the like), which reduces the service life and also early deteriorates the attachment of the rotary cutter to the stationary cutter, that is, the rubbing condition between both the cutting portions thereof, thus harming mowing efficiency.

OBJECT AND SUMMARY OF THE INVENTION

An object of the invention is to provide a mowing cutter for a mower capable of almost eliminating the variation of the load applied on the rotary cutter even when the grass taken between both the cutting portions of the rotary and the stationary cutters, thereby making it possible to mow grass smoothly and effectively for a long period.

To achieve the above object, in a preferred mode of the present invention, there is provided a mowing cutter unit of a mower comprising a rotary cutter and a stationary cutter coaxially overlapped to each other, wherein the rotary cutter is formed in an approximately polygonal shape in plan view and is formed with recessed cutting portions each being curved in an approximately doglegged shape in the rotational direction on the vortexes thereof respectively; and the stationary cutter is formed with projecting cutting portions slidably contacted with respective recessed cutting portions of the rotary cutter on the peripheral edge, wherein each of the projecting cutting portions is shaped in a loosely circular arc from the cutting base to the cutting leading edge and a crossing angle at which the projecting cutting portion is rubbed with a grass pushing-out portion of the recessed cutting portion is larger than a crossing angle at which it is rubbed with a grass taking-in portion thereof.

DETAILED DESCRIPTION OF PREFERRED EMBODIMENTS

Figure 1:
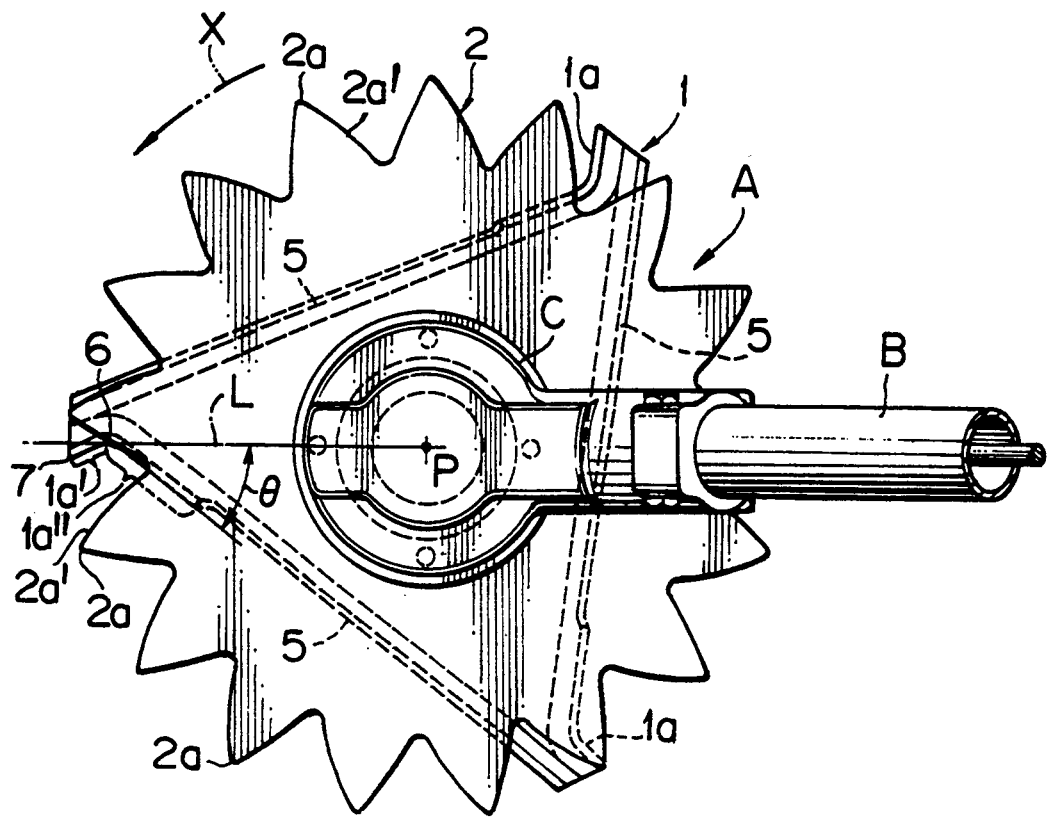
FIG. 1 is a plan view showing one embodiment of a mowing cutter unit for a mower according to the present invention.
Figure 2:
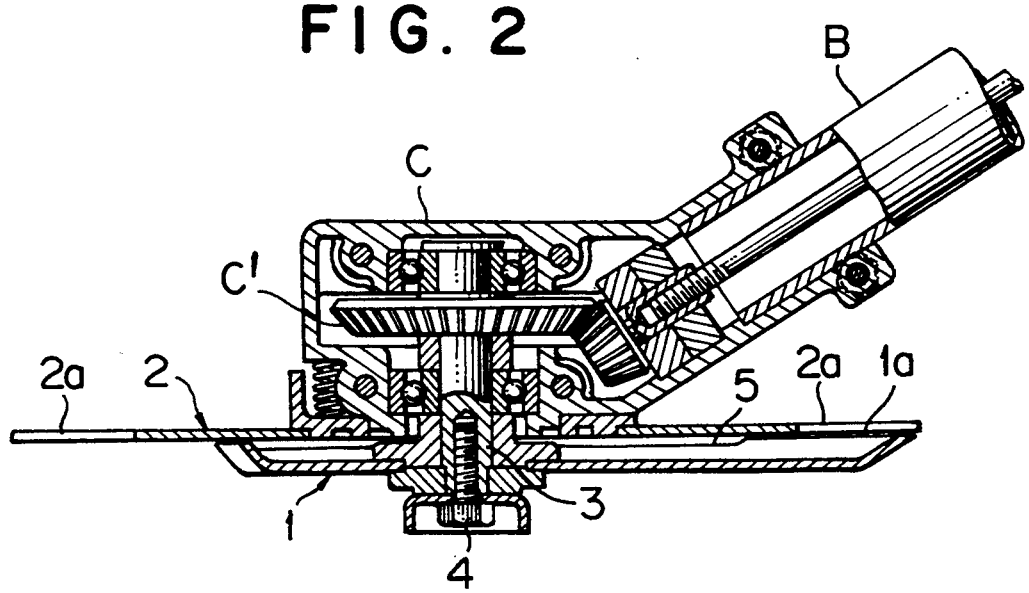
FIG. 2 is an enlarged vertical sectional front view of FIG. 1.

A mowing cutter unit A includes of a rotary cutter 1 and a stationary cutter 2 coaxially overlapped to each other, and is mounted at the leading edge of a holding lever B including a drive motor through a gear case C housing a power conversion mechanism C'. Namely, the rotary cutter 1 is fixed on a drive shaft 3 projecting downwardly from the lower portion of the gear case C with a bolt 4, and the stationary cutter 2 is coaxially overlapped on the upper surface of the rotary cutter 1, and is integrally fixed on the lower surface of the gear case C. Thus, the power from the drive motor is transmitted from the power conversion mechanism C' to the rotary cutter 1 through the drive shaft 3, and the rotary cutter 1 is rubbed with the stationary cutter 2 by the rotation of the rotary cutter 1 thereby mowing grass.

The rotary cutter 1 is formed by pressing in such a manner as slantly forming rising-up portions 5 having a desired height around the whole peripheral edge into a shallow disk having an approximately polygonal shape such as an approximately triangular or square shape in plan view. On each vortex portion of the rising-up portions 5, each recessed cutting portion 1a to be rubbed with each projecting cutting portion 2a of the stationary cutter 2 is formed to be curved in an approximately doglegged shape in the rotational direction X of the rotary cutter 1. The recessed portions 1a are ground later.

The rising-up portions 5 are intended to reinforce the rotary cutter 1, and are raised slantly around the whole peripheral edges of the four sides of the rotary cutter 1. Accordingly, the rising-up portions 5 are crossed to each other in an approximately V-shape or U-shape at each vortex portion of the rotary cutter 1, and thereat, each recessed cutting portion 1a is formed.

The recessed cutting portion 1a is raised slightly higher than the rising-up portion 5 formed on the peripheral edge of the rotary cutter 1, and is formed to be curved in an approximately doglegged shape in the rotational direction X of the rotary cutter 1.

Namely, as shown in FIG. 1, the recessed cutting portion 1a is formed to be curved in an approximately doglegged shape in such a manner that a grass taking-in portion 1a' extending from a central curved portion 6 to a cutting leading edge 7 is directed in the rotational direction X of the rotary cutter 1 and a grass pushing-out portion 1a'' continuous from the central curved portion 6 to the rising-up portion 5 is directed to the outside. Further, the recessed cutting portion 1a is formed in such a manner that it is positioned ahead from a radial line L passing from a rotational center P of the rotary cutter 1 to the central curved portion 6 in the rotational direction X of the rotary cutter 1, and the grass pushing-out portion 1a'' is crossed to the radial line L at an acute angle $\theta$.

Also, the stationary cutter 2 is formed as a flat plate, and has a plurality of projecting cutting portions 2a each having an approximately angular shape to be slid with the recessed cutting portions 1a of the rotary cutter 1 respectively on the peripheral edge at equal intervals. Further, the cutting base 8 between the adjacent projecting cutting portions 2a is shaped into a circular arc.

In the projecting cutting portion 2a, a cutting edge portion 2a' extending from a circular edge base 8 to a cutting leading edge 9 is formed on the side to be oppositely and slidably contacted with the recessed cutting portion 1a of the rotary cutter 1 in a loosely circular arc toward the recessed cutting portion 1a of the rotary cutter 1. In this case, as shown in FIG. 3, the circular cutting edge portion 2a' is formed in such a manner that a crossing angle $\theta''$ at which it is rubbed with the grass pushing-out portion 1a'' of the recessed cutting portion 1a is larger than a crossing angle $\theta'$ at which it is rubbed with the grass taking-in portion 1a' ($\theta'' > \theta'$).

Figure 3A:
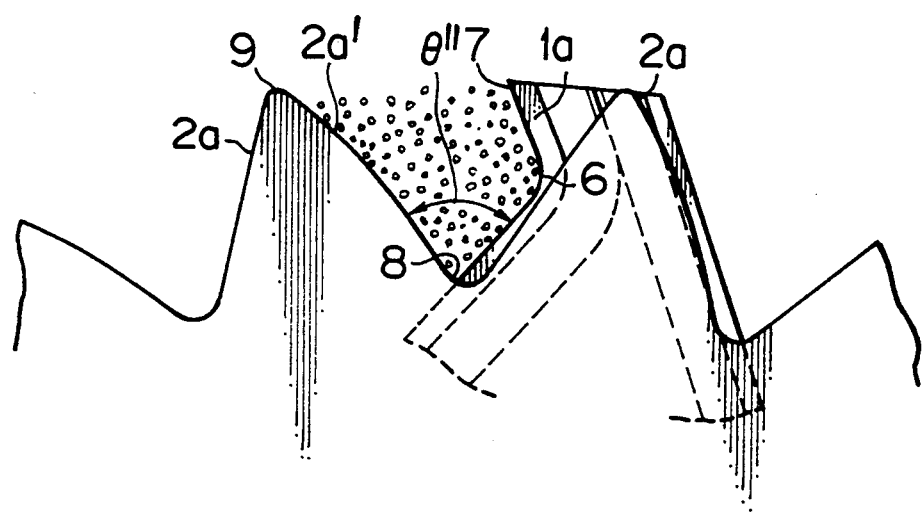
FIGS. 3A, 3B and 3C are enlarged plan views explaining the process of mowing grass using the mowing cutter unit for a mower according to the present invention.

Thus, according to the mowing cutter unit A of the present invention, when the rotary cutter 1 is rotated in the direction of the arrow X, grass is scraped by the grass taking-in portions 1a' of the recessed cutting portions 1a of the rotary cutter 1 to be thus taken between the projecting cutting portions 2a of the stationary cutter 2 and the same (in the state as shown in FIG. 3A).

Figure 3B:
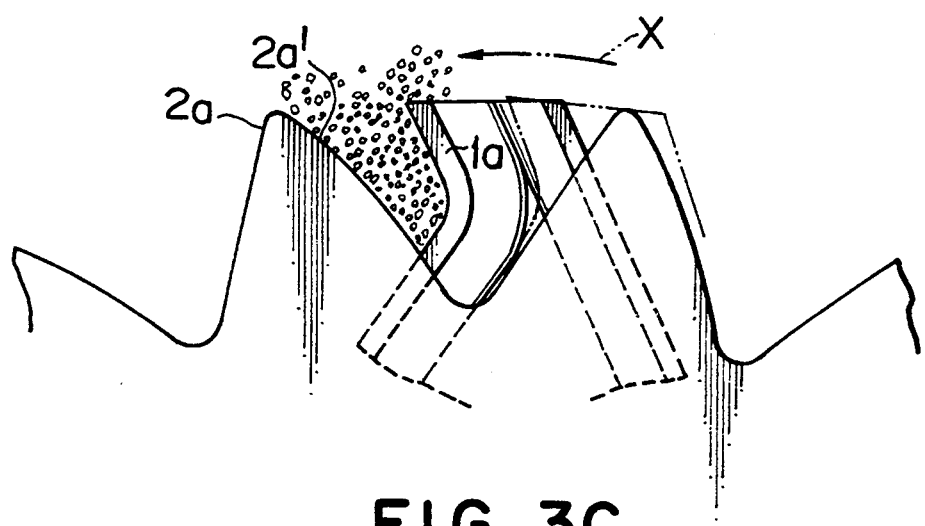
Figure 3C:
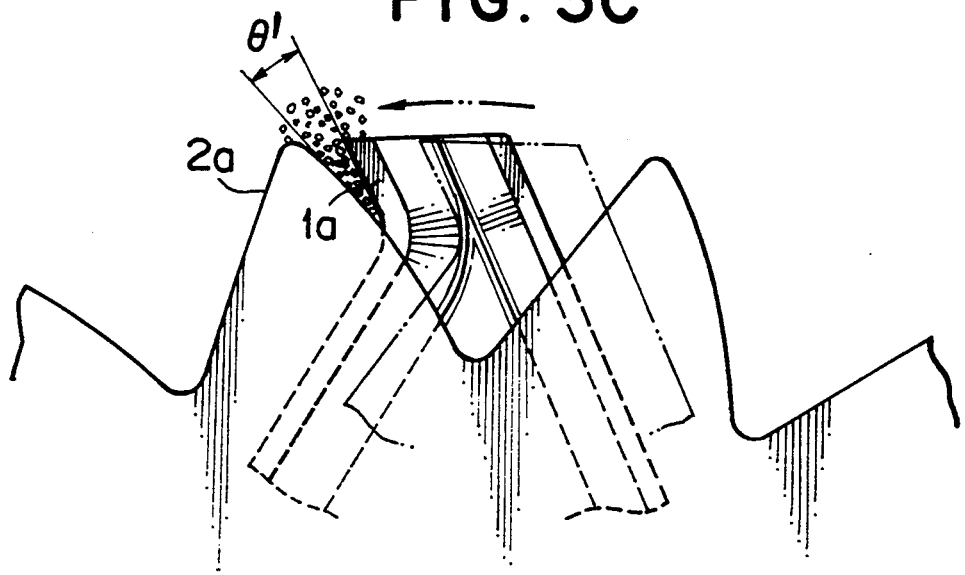

First, the grass taken between the recessed cutting portions 1a of the rotary cutter 1 and the projecting cutter portions 2a of the stationary cutter 2 is sequentially cut-off by the grass pushing-out portions 1a'' of the recessed cutting portions 1a and the circular cutting edge portions 2a' of the projecting cutting portions 2a (in the state as shown in FIG. 3B). Next, the grass is cut-off by the grass taking-in portions 1a' of the recessed cutting portions 1a and the circular cutting edge portions 2a' of the projecting cutting edge portions 2a (in the state as shown in FIG. 3C).

In this case, since the crossing angle $\theta''$ between the loosely circular cutting edge portion 2a' of the projecting cutting portion 2a and the grass pushing-out portion 1a'' of the recessed cutting portion 1a is larger than the crossing angle $\theta'$ between the loosely circular cutting edge portion 2a' and the grass taking-in portion 1a', when a large amount of grass is taken in, the grass is cut-off by the loosely circular cutting edge portions 2a' of the projecting cutting portions 2a and the grass pushing-out portions 1a'' of the recessed cutting portions 1a and is simultaneously pushed outwardly along the loosely circular cutting edge portions 2a' of the projecting cutting portions 2a. Thus the remaining grass in a suitable amount is cut-off by the loosely circular cutting edge portions 2a' of the projecting cutting portions 2a and the grass taking-in portions 1a' of the recessed cutting portions 1a (in the state as shown in FIGS. 3B to 3C).

The mowing cutter unit for a mower of the present invention is so constructed as described above and thus has the following functional effects:

1. Since grass can be taken in in a manner to be scraped by the grass taking-in portions of the recessed cutting portions each having the approximately doglegged shape in the rotational direction of the rotary cutter, it is possible to enlarge the effect of taking in grass, thereby improving the efficiency of mowing grass.

2. Since the grass taken between the recessed cutting portions of the rotary cutter and the projecting cutting portions of the stationary cutter is first cut-off by the grass pushing-out portions of the recessed cutting portions and the circular cutting edge portions of the projecting cutting portions, and subsequently, it is sequentially cut-off by the grass taking-in portions of the recessed cutting portions and the circular cutting edge portions of the projecting cutting portions, it is possible to almost eliminate the variation of the load applied on the rotary cutter and hence to mow grass effectively for a long period.

3. Since the crossing angle $\theta''$ between the loosely circular cutting edge portion of the projecting cutting portion and the grass pushing-out portion of the recessed cutting portion is larger than the crossing angle $\theta'$ between the loosely cutting edge portion of the projecting cutting portion and the grass taking-in portion, even when the grass in a large amount not to be cut is taken in, the grass is cut-off by the loosely circular cutting edge portions of the projecting cutting portions and the grass pushing-out portions of the recessed cutting portions and is simultaneously pushed outwardly along the loosely circular cutting edge portions of the projecting cutting portions. Thus the remaining grass in a suitable amount is cut-off by the loosely circular cutting edge portions of the projecting cutting portions and the grass taking-in portions of the recessed cutting portions. Accordingly, the rotary cutter is never locked by the taken-in grass, which eliminates the possibility of causing the the variation of the load applied on the rotary cutter even when the amount of the grass is varied, thereby making it possible to mow grass smoothly and effectively for a long period, and to keep the preferable rubbing condition between both the cutting portions of the rotary and the stationary cutters for a long period.

I claim:

1. A mowing cutter unit for a mower comprising a rotary cutter and a stationary cutter coaxially overlapped to each other, wherein said rotary cutter is formed with recessed cutting portions each being curved in an approximately doglegged shape toward a rotational direction, and said stationary cutter is formed with a plurality of projecting cutting portions each having an approximately angular shape to be slidably contacted with said recessed cutting portions of said rotary cutter respectively;

wherein said rotary cutter is formed in a polygonal shape in plan view having rising-up portions formed around a whole peripheral edge, each of said recessed cutting portions is formed at each vortex portion at which said rising-up portions are crossed to each other;

wherein each of said recessed cutting portions is formed to be curved in an approximately doglegged shape in such a manner that a grass taking-in portion extending from a central curved portion to a cutting leading edge is directed in the rotational direction of said rotary cutter and a grass pushing-out portion continuous from the central curved portion to the rising-up portion is directed to the outside; wherein said recessed cutting portion is formed such that it is positioned ahead of a radial line passing from the rotational center of said rotary cutter to the central curved portion in the rotational direction of said rotary cutter, wherein said grass pushing-out portion crosses the radial line at acute angles;

wherein each of said projecting cutting portions is formed in such a manner that it is shaped in a loosely circular arc from a cutting base to a cutting leading edge, and a crossing angle at which said projecting cutting portion is rubbed with a grass pushing-out portion of said recessed portion formed on said rotary cutter is larger than a crossing angle at which it is rubbed with a grass taking-in portion of said recessed cutting portion.

* * * * *